(12) United States Patent
Hoogerbrugge

(10) Patent No.: US 8,176,361 B2
(45) Date of Patent: May 8, 2012

(54) DATA PROCESSING WITH PROTECTION AGAINST SOFT ERRORS

(75) Inventor: Jan Hoogerbrugge, Helmond (NL)

(73) Assignee: Nytell Software LLC, Wilmington, DE (US)

( * ) Notice: Subject to any disclaimer, the term of this patent is extended or adjusted under 35 U.S.C. 154(b) by 122 days.

(21) Appl. No.: 12/673,898

(22) PCT Filed: Aug. 15, 2008

(86) PCT No.: PCT/IB2008/053284
§ 371 (c)(1),
(2), (4) Date: Feb. 17, 2010

(87) PCT Pub. No.: WO2009/024907
PCT Pub. Date: Feb. 26, 2009

(65) Prior Publication Data
US 2011/0072303 A1    Mar. 24, 2011

(30) Foreign Application Priority Data
Aug. 17, 2007 (EP) ..................................... 07114487

(51) Int. Cl.
*G06F 11/00* (2006.01)
(52) U.S. Cl. .............................. 714/10; 714/11; 712/227
(58) Field of Classification Search .................... 714/10, 714/11, 38.1, 41; 712/28, 227; 717/140, 717/149, 154
See application file for complete search history.

(56) References Cited

U.S. PATENT DOCUMENTS

| | | | |
|---|---|---|---|
| 7,134,047 B2 * | 11/2006 | Quach | 714/11 |
| 7,331,043 B2 * | 2/2008 | Saulsbury | 714/11 |
| 2001/0054095 A1 | 12/2001 | Kampe et al. | |
| 2002/0199175 A1 | 12/2002 | Saulsbury | |
| 2004/0041590 A1 | 3/2004 | Bernstein et al. | |
| 2005/0066079 A1 * | 3/2005 | Luick | 710/36 |
| 2006/0036913 A1 | 2/2006 | Krasnansky | |
| 2006/0279318 A1 | 12/2006 | Iwaya | |
| 2007/0088979 A1 * | 4/2007 | Pomaranski et al. | 714/10 |

(Continued)

OTHER PUBLICATIONS

Chen, G., et al; "Compiler-Directed Selective Data Protection Against Soft Errors"; Design Automation Conference 2005 Asia & South Pacific; IEEE; vol. 2; pp. 713-716 (Jan. 2005).

(Continued)

*Primary Examiner* — Robert Beausoliel, Jr.
*Assistant Examiner* — Joseph D Manoskey
(74) *Attorney, Agent, or Firm* — McAndrews, Held & Malloy, Ltd.

(57) ABSTRACT

A processing circuit has functional units (10a-c) configured to perform operations each in response to a respective command. The functional units (10a-c) are configured to execute at least one of the operations with a selectable level of susceptibility to incurring an error during execution. Different functional units may be provided, designed to execute the same operation with different levels of susceptibility at the cost of more circuit area, power consumption or execution time in the case of less susceptibility. The less susceptible functional unit may comprise additional error correction circuits, or more pipeline stages for example. The program directs commands to execute the operation to different functional units according to the required level of susceptibility. High level programs may be provided wherein variables are declared with a specified level of reliability. These declarations may be used during compilation to select how instructions will be executed.

19 Claims, 3 Drawing Sheets

U.S. PATENT DOCUMENTS

2008/0168305 A1* 7/2008 Gschwind et al. ............ 714/10
2008/0229145 A1* 9/2008 Bose et al. ................... 714/10

OTHER PUBLICATIONS

Yan, J., et al; "Compiler-Guided Register Reliability Improvement Against Soft Errors"; Proceedings of the 5TH ACM Int'l Conference on Embedded Software; p. 203-209 (Sep. 2005).

Mehrara, M., et al; "Reliability-Aware Data Placement for Partial Memory Protection in Embedded Processors," Proceedings of the 2006 Workshop on Memory System Performance and Correctness; pp. 11-18 (Oct. 2006).

Chen, G., et al; "Runtime Integrity Checking for Inter-Ojbect Connections"; Proceedings of the 2005 IEEE/ACM Int'l Conference on Computer-Aided Design; pp. 303-306 (2005).

International Search Report for Int'l. Patent Appln. PCT/IB2008/053284 (Jul. 8, 2009), Published as WO 2009/024907A3.

* cited by examiner

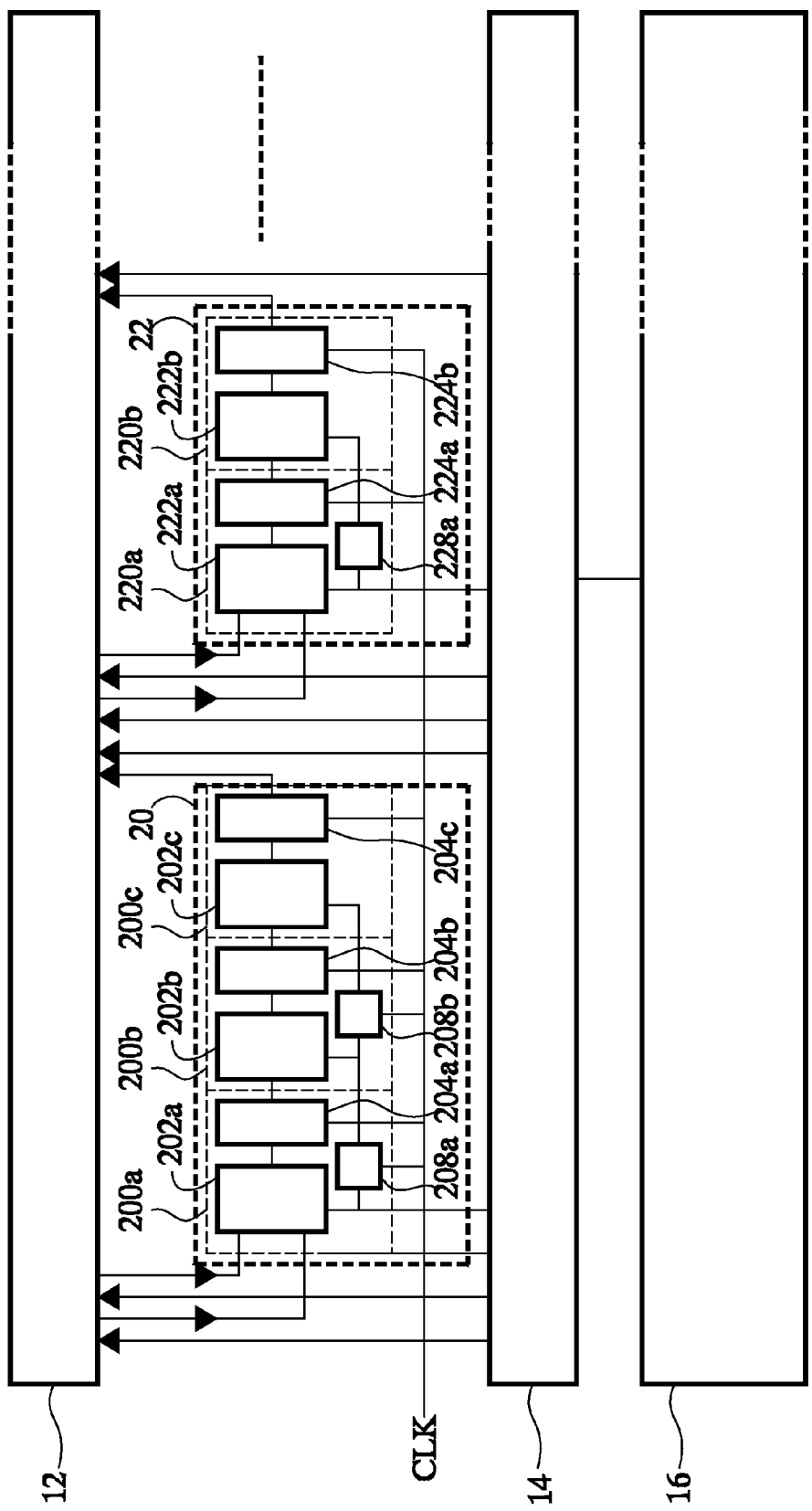

DATA PROCESSING WITH PROTECTION AGAINST SOFT ERRORS

FIELD OF THE INVENTION

The invention relates to error protected data processing.

BACKGROUND OF THE INVENTION

US patent application No 20020199175 describes a technique for protecting data processing operations against errors. The application specifically concerns so-called soft errors. A typical cause of soft errors is radioactive radiation, when this radiation topples data values observed by a data processor. Such soft errors cannot be traced to permanent circuit or program faults. As used herein, soft errors are errors that cannot be traced to a permanent hardware or program error, whatever their cause. When a soft error occurs during execution of a computer program by a data processor this may give rise to erroneous output data from the processor or even to erroneous program flow.

US patent application No 20020199175 describes that program elements may be protected against soft errors by duplication of instruction execution, i.e. by expanding a program with redundant instructions selected to produce duplicate results. The duplicate results are compared with the results of normal instructions of the program. When the results do not match, it is assumed that a soft error has occurred and corrective action is taken.

US patent application No 20020199175 applies this technique only to selected parts of the program, in order to avoid unnecessary reductions in program performance. Various criteria are described for selecting these parts. These techniques include identifying program parts that use hardware that is more than usually susceptible to soft errors, identifying program parts that use variables that are kept in soft error susceptible memory for a long time and program parts that use data that may have a large impact on processing.

Other techniques of protection against soft errors include the use of data that is encoded in an error correcting code combined with error correction hardware. Also, data processing circuits may be specifically designed to have a better tolerance for the causes of soft errors. However, these techniques come at the cost of hardware overhead. The use of duplicative instructions avoids the need for such hardware overhead. Unfortunately, this has its own overhead cost, in that program execution is slowed down and more power is consumed to execute the program, even if duplication is applied only to selected parts of the program.

SUMMARY OF THE INVENTION

Among others, it is an object to provide protection against soft errors with reduced overhead cost.

A processing circuit according to claim 1 is provided. Herein an operation may be executed with a selectable level of susceptibility to incurring an error during execution. Functional units are provided for performing each operation in response to a respective command. In an embodiment the level of susceptibility is selected by selecting whether a command for the operation is executed by a first or second one of the functional units. In this embodiment the first and second functional units have mutually different circuit structures for performing the operation, the circuit structure of the first one of the functional units providing for a lower level of susceptibility to incurring the error than the circuit structure of the second one of the functional units. In an alternative embodiment a functional unit may be switched between execution at a first level of susceptibility or a second level of susceptibility for executing the operation dependent on selection information from a program.

The functional unit with higher susceptibility to error typically has an advantage over the other functional unit in one or more other aspects such as a higher speed, smaller circuit area and/or less power consumption. Commands from a program to execute the operation may be directed to the functional units according to level of reliability that is needed for the result. Thus, for example, addition operations whose results are only used for video display could be computed with less reliability than additions with results that are used for control purposes.

Overhead can be reduced because for commands that are not required to produce highly reliable results it may be selected to executed the operation with more susceptibility to errors. Thus, for example power consumption may be reduced, or speed may be increased by assigning commands for producing less reliable results to lower power consuming or faster functional units that are more susceptible to errors. As another example, when the different functional units may be used to execute commands in parallel, the circuit area may be reduced by providing part of functional units with low susceptibility but large circuit area, using additional smaller but more susceptible functional units. In this way reliable results can always be ensured by assigning instructions to the less susceptible functional unit, and more parallelism can be achieved with less overhead by assigning instructions that need not produce highly reliable results to other functional units.

A functional unit with lower susceptibility to errors may be realized for example by using larger transistors or by providing additional shielding than in a comparable functional unit with higher susceptibility, both being present in the processor to execute the same type of operation in response to a command. In an embodiment error correction circuits may provided in the functional unit with lower susceptibility to errors, the functional unit with higher susceptibility having no such error correction circuits. In another embodiment more reliability may be realized by using more pipeline stages for executing a command in the functional unit with lower susceptibility than in the functional unit with higher susceptibility. In an embodiment functional units are provided for two selectably distinct levels of susceptibility to errors, but alternatively more distinct levels may be used. Additionally different registers may be used that provide for different levels of susceptibility to soft errors.

The processor may be programmed with a program that makes use of the different levels of susceptibility, for example by avoiding the use of functional units with higher susceptibility to error in computations that directly or indirectly lead to a result for which high reliability is required. Thus, in the program commands for the functional unit with a low susceptibility never use results from functional units with a higher susceptibility. Commands for the functional unit with a higher susceptibility may use results from any functional unit.

The processor may be supported by a compiler that assigns commands for performing the same operation to different functional units dependent on the level of reliability that is needed for the result. In an embodiment data dependencies may be traced to determine commands with results that directly or indirectly affect results that need, or need not, have a certain level of reliability, in order to assign the commands to the functional units accordingly. In different embodiments, positive or negative specifications may be used. With a positive specification all reliable results are indicated and only commands that produce results that do not directly or indirectly affect the reliable results may be assigned to more susceptible functional units. With a negative specification at least some results are indicated that need not be reliable and commands that produce these results and do not directly or indirectly other results may be assigned to more susceptible functional units. In an embodiment a required level of reliability of results may be indicated by programmers in high level program, a compiler being provided to translate this into assignment to functional units.

BRIEF DESCRIPTION OF THE DRAWINGS

These and other objects and advantageous aspects will become apparent from a description of exemplary embodiments, using the following Figures.

FIG. 3 shows a data processing circuit

DETAILED DESCRIPTION OF EXEMPLARY EMBODIMENTS

Figure 1:
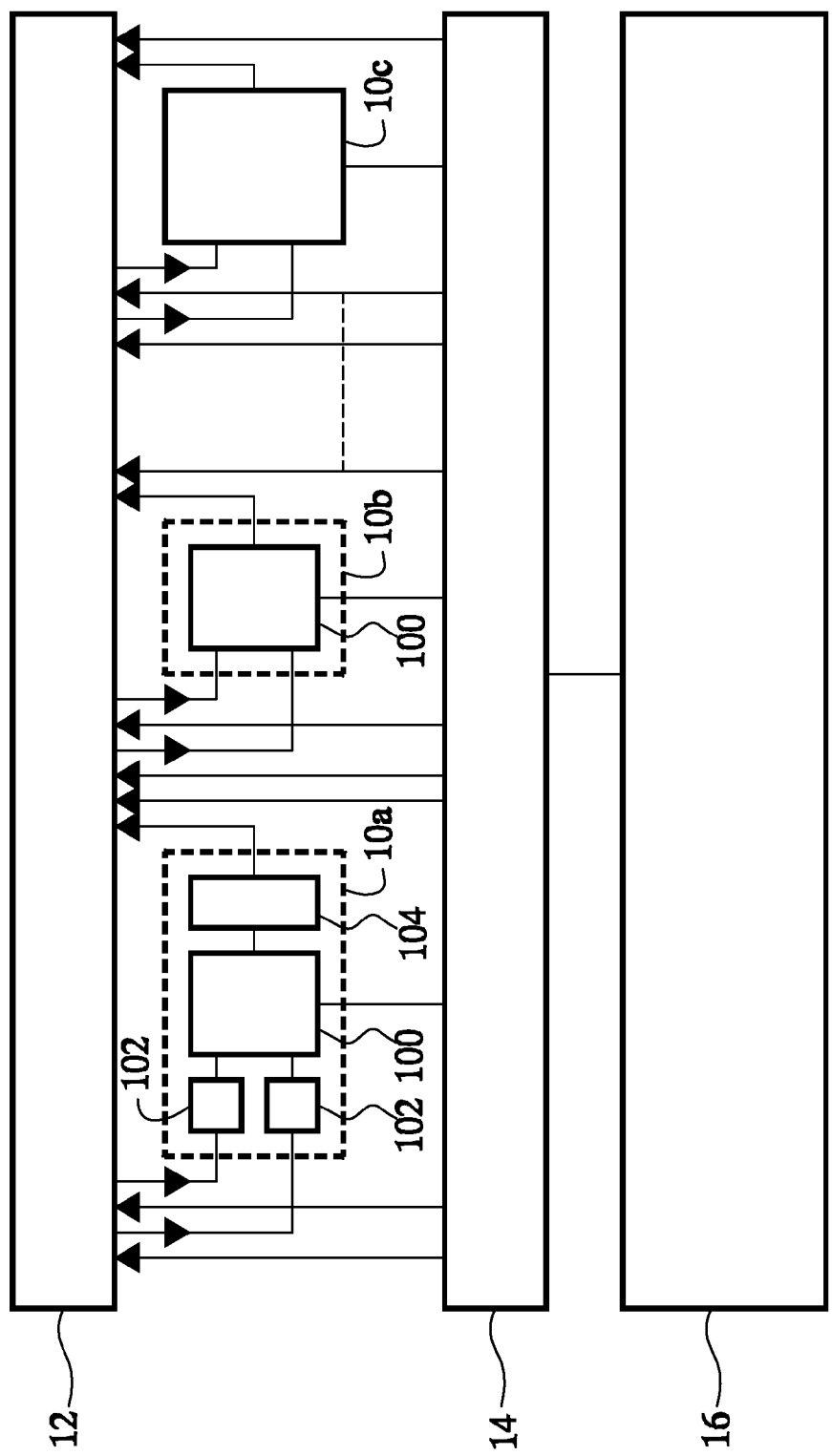
FIG. 1 shows a data processing circuit

FIG. 1 shows a data processing circuit comprising a set of functional units 10*a-c*, a register file 12, an instruction memory 16 and an instruction issue circuit 14. By way of example a data processing circuit with a VLIW (Very large Instruction Word) architecture is shown, although it should be appreciated that other architectures may be used. Moreover, although three functional units 10*a-c* are shown, it should be understood that many more may be present. Any one of functional units 10*a-c* may for example be a multiplier, an arithmetic logic unit, a memory access unit, a specialized function circuit, etc. Instruction issue circuit 14 has an input coupled to instruction memory 16 and outputs coupled to selection inputs of functional units 10*a-c* and address selection inputs of ports of register file 12. Functional units 10*a-c* have operand inputs coupled to the ports of register file 12 and result outputs coupled to the ports of register file 12.

Functional units 10*a-c* include functionally a first and second functional unit 10*a,b* that are functionally equivalent, but implemented in mutually different ways, which result in different levels of susceptibility to soft errors. By way of example one functional unit 10*a* is shown with a core 100, error correction circuits 102 between operand inputs of core 100 and operand inputs of the functional unit 10*a*, as well as an error correcting code encoder 104 between the result output of core 100 and the result output of the functional unit 10*a*. Another functional unit 10*b* comprises a core 100 of the same type, but no error correction circuits or error correcting code encoder. Core 100 may be a multiplier for example, or an arithmetic/logic unit or any other type of circuit.

It should be understood that functional units with different levels of susceptibility to soft errors may be realized in many other ways. For example lower susceptibility to soft errors that arise during instruction execution may be realized by using circuit that draw larger currents to represent data, e.g. by using wider transistors in a functional unit that is less susceptible, as compared to a functional unit that is more susceptible. As another example, lower susceptibility to soft errors may be realized by means of circuits that perform the same function with different circuits. For example, look up table functional units could be provided with memories with differently sized memory cells, or different types of memory cells, different types of adder circuit and other arithmetic or logic circuits could be used, processing of differentially encode bits could be used in one functional unit and single ended encoded bits could be used in another functional unit, etc. Although functionally equivalent functional units 10*a, b* with only two levels of susceptibility to soft errors are shown, it should be appreciate that more than two functionally equivalent functional units with increasingly lower levels of susceptibility may be provided. Also, there may be different sets of functionally equivalent functional units, in which each functional unit has its own level of susceptibility to soft errors, which may differ from the level of other functional units in the set (herein each set is associated with a respective functions (e.g. multiplier or arithmetic unit), the functional units within a set all have the same function associated with the set).

In a further embodiment, register file 12 may contain different types of register with different levels of susceptibility to soft errors. Thus for example part of the registers may be made up of wider transistors than those used equivalently for other registers, or different register circuit structures may be used. In an embodiment the width of the registers differs, some registers comprising additional storage locations for storing error correction information and others not comprising such storage locations. In this case the second functional unit 10*b* with higher level of susceptibility to errors may not use the error correction information and/or supplying default error correction information in its results.

In operation, instruction issue circuit 14 loads instructions from instruction memory 16 and issues command information derived from these instructions to functional units 10*a-c* and address inputs of register file 12. In response to this information register file 12 outputs operand data from operand registers that are selected by the information, functional units 10*a-c* execute operations selected by the information using the operand data and register file 12 writes results from functional units 10*a-c* to result registers that are selected by the information.

Prior to execution commands are assigned to different functional units 10*a-c* for execution by these functional units. In an embodiment this is done during compilation of an input program. Known VLIW compilation techniques assign commands from such an input program to different functional units in a way that minimizes required execution time for the program as a whole, and on the basis of the capability of the functional units to execute the instructions. It has also been known to make the assignment dependent on minimization of program size or energy consumption needed to execute the program.

Figure 2:
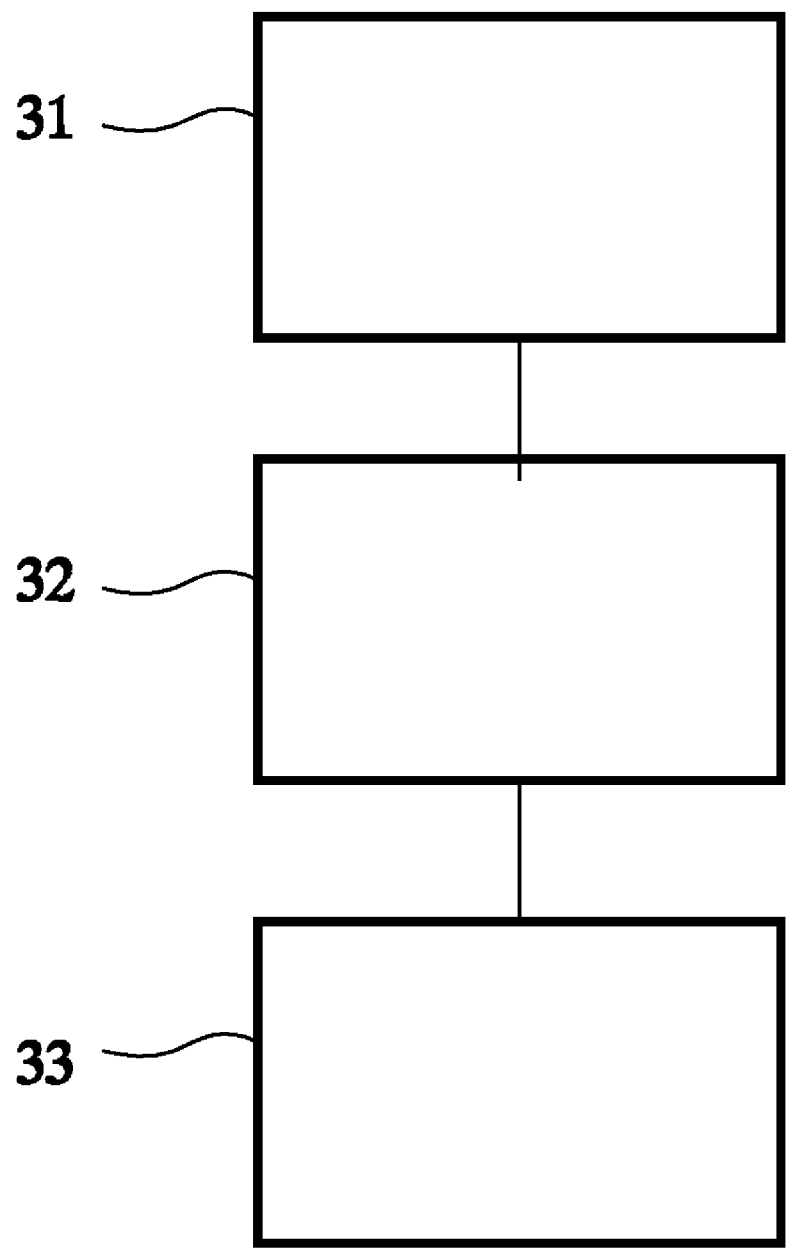
FIG. 2 shows a flow chart of compilation

FIG. 2 shows a flow chart of a method of compilation. The steps of the flow charts may be performed by a general purpose computer (not shown). As used herein, compilation comprises assignment of commands to functional units of the processing circuit of FIG. 1. Compilation may be performed by a compiler. As used herein, compiler is a computer program product comprising any computer program that, when executed by a computer, causes the described steps of the compilation method to be performed.

In the method the assignment of commands to functional units is made dependent on indications of the required level of soft error protection for the results of operations performed by the functional units. In a first step 31 the computer receives a program with command codes for implementation on the processing circuit of FIG. 1, in combination with information indicating the protection level of results of the commands. In an embodiment the level may have one of two values. In other embodiments a more refined indication with more selectable levels may be used.

In a second step 32 the computer marks all commands that can be executed by functional units 10*a, b* with different levels of susceptibility, to indicate a protection level for each command. When the information indicating the protection level of the results is provided for all commands, second step 32 is merely a matter of marking each command according to the protection level of its results. If not all results have an indicated protection level second step 32 involves tracing back dependencies of the results (determining which other commands produced the operands of the command that produces the result and so on) and marking each command with the highest level of protection of any result that directly or indirectly depends on the command.

Effectively, the marking of the commands distinguishes functionally identical commands into different versions of the commands. A functional unit 10a that functionally supports a command may be taken to support all versions of the command up to the version with the protection level supported by the functional unit 10a. In the embodiment with two levels, the functional unit 10b with higher susceptibility to soft errors supports only the version of the command with the low level of protection, whereas the functional unit 10a with lower susceptibility to soft errors supports both versions of the command for both levels.

In a third step 33 the computer assigns commands to functional units 10a-c. This can be done using known VLIW command assignment algorithms, with the distinction that commands with differently marked levels of protection are treated as different commands and the functional units 10a-c are treated as supporting different ones of these commands. In the embodiment with two levels of protection, the functional unit 10b with higher susceptibility to soft errors supports is treated as supporting only the command if marked with a low level of protection, whereas the functional unit 10a with lower susceptibility to soft errors is treated as supporting the command with both low and high level protection marking. Otherwise, any known form of optimization of the assignment of commands may be used.

The resulting program with assignment of commands to functional units 10a-c is subsequently installed in instruction memory 16 from where it is executed by the processing circuit of FIG. 1. A similar technique may be used to assign registers for storage of operands and results of commands, if registers with different levels of susceptibility to errors are provided. Results that are directly or indirectly required to have a high level of protection may be assigned to registers with a lower susceptibility to errors, whereas other results may be assigned to any register.

In an embodiment the level of protection may be indicated by a programmer in a high level language description, in the form of attributes of variables of the program. The following is an example of such a program in a Java-like language

```
int ff(int[ ] buffer1, unprotected int[ ] buffer2, int n, int x)
{       for(int i=0;i<n;i++)
{       int a=i*i;
buffer1[ i ]= x*a;
buffer2[ i ]= a*a;
}
}
```

Herein the attribute "unprotected" indicates that the values in the array called "buffer2" may be computed with a low level of protection against soft errors. The absence of this attribute for other variables such as the array "buffer1" indicates that a high level of protection is needed for those other variables. By tracing back the dependencies it can be seen that the multiplication operations for computing a=i*i and x*a must be performed with a multiplier functional unit with a low level of susceptibility to soft errors. In contrast, the multiplication operation for computing a*a may be performed with a multiplier functional unit with any level of susceptibility, as its result is only use in the array buffer 2, which has the attribute "unprotected".

In an embodiment a compiler is provided for processing high level language computer programs of this type, with a protection attribute information associated with selected variables. Like a conventional compiler this compiler converts the high level language computer programs into a program of commands. Conventional compilers also produce information linking results of commands to names of variables. In addition the compiler provides information marking commands that produce results for variables with names for which the attribute information indicates a level of protection. This information is then used in the assignment of commands to functional units, as described.

The preceding embodiments were directed at providing a selectable level of protection against soft errors. Accordingly, functionally equivalent functional units 10a, b with different implementations that provide for different levels of susceptibility to soft errors were used. However, the use of functionally equivalent functional units 10a, b may also be applied in relation to other errors. This makes it possible to use functional units 10b that have implementation advantages at the cost of an increased risk of errors that do not depend on soft errors.

FIG. 3 shows an embodiment wherein functionally equivalent pipelined functional units 20, 22 are be used that comprise a series of one or more pipeline stages 200a-c, 220a, b, each pipeline stage 200a-c, 220a, b, comprising a logic circuit 202a-c, 222a, b that performs a respective part of the function of the functional units 20, 22 and a register 204a-c, 224a, b. The logic circuit 202a-c, 222a, b of each pipeline stage 200a-c, 220a, b is coupled to the output of the intermediate register 204a, b, 224a of the previous pipeline stage or, in the case of the first pipeline stage 200a, 220a, to the input of the functional unit 20, 22. The output of the register 204c, 224b of the final pipeline stage 200c, 220b is coupled to the result output of the functional unit 20, 22. The intermediate registers 204a-c, 224a, b receive clock signals to capture data from the preceding logic circuits 202a-c, 222a, b. In addition a command register pipeline 208a, b 228a, may be provided for supplying commands from the instruction issue circuit 14 to the logic circuits 202b-c in successive instruction cycles. The function of this command register pipeline may alternatively be performed by the instruction issue circuit 14.

As may be noted pipelined functional units 20, 22 have mutually different numbers of pipeline stages, three stages and two stages in the example shown. The logic circuits 202a-c, 222a,b of both functional units 20, 22 perform the same overall function, but a notional overall logic circuit for performing this function has been split into logic circuits 202a-c, 222a,b in different ways for the different pipelined functional units 20,22. This split is based on a compromise: increasing the number of pipeline stages 200a-c, 220a, b increases instruction cycle latency, but it is tolerant for larger fluctuations in logic circuit delays (e.g. due to power supply fluctuations, temperature fluctuations or interference). Conversely, using fewer pipe-line stages 200a-c, 220a, and b reduces latency at the expense of increased risk of errors due to delay fluctuations.

In the processing circuit, commands that use the functionality of functional units 20, 22 and require a highest level of protection are assigned only to the functional unit 20 (or similar units) with most pipeline stages, whereas similar commands that require a lower level of protection may be assigned to any of the functional units 20, 22 that support the required function. Thus, by providing functional units with the same function, but implemented using mutually different numbers of pipeline stages, the time needed to execute a program can be reduced using fewer pipeline stages overall. As will be appreciated this may be realized this may be achieved with functional units with any numbers of pipeline stages, as long as different numbers are used, not merely with the numbers of pipeline stages shown in the figure. One of the functional units may even consist of a single pipeline stage, so that it is effectively not pipelined. Also of course additional of processing circuits with the same number of stages may be used in addition to the functional units with different pipeline stages.

In another embodiment different functional units may be selected on the basis of susceptibility to parasitic interference from other circuits, functional units with less susceptibility to parasitic interference being used when results with a high level of protection are needed. The level of susceptibility to parasitic interference may depend on a distance to source of interference, or on the presence or absence of a barrier against such interference adjacent the functional unit. Accordingly, assignment of commands may be made dependent on such features.

In the embodiments shown so far a VLIW architecture has been shown, wherein the functionally equivalent functional units are connected to different issue slots that a capable of issuing commands in parallel. This makes it possible to reduce execution time by using parallelism with less overhead than needed for a plurality of least susceptible functionality.

When the least susceptible functional unit has a structure that consumes more power to execute a command than the most susceptible functional unit, this may be used to reduce power consumption, by executing commands that require less protection with the most susceptible functional unit.

When the least susceptible functional unit has a structure that requires more time to execute a command than the most susceptible functional unit, this may be used to reduce execution time, by executing commands that require less protection with the most susceptible functional unit.

Different architectures may be used. In an embodiment functionally equivalent functional units with different levels of susceptibility are coupled to a common issue slot, so that only one of these functional units may receive a new command at a time. In further embodiments architectures other than VLIW architectures may be used, such as scalar architectures with the functionally equivalent functional units. This makes it possible to reduce power consumption and/or processing time.

Although an embodiment has been shown wherein different functional units have been provide that have different levels of susceptibility to errors, it may be noted that alternatively, a functional unit may be provided that has a switchable level of susceptibility to errors. Thus, for example, the number of pipeline stages in the functional unit and/or the position of their borders may be switched, for example by using multiplexers that select between taking signals for logic circuits from a register that captures data from preceding logic circuits and taking the signals directly from the preceding logic circuits. As another example, error correction circuitry may be selectively enabled or disabled. In this case, commands may be expanded by a level indication signal to indicate the level of susceptibility to error that is required.

In another embodiment selection of the functional unit 10a,b may be controlled by register addresses in commands, the instruction issue unit selecting a less susceptible functional unit to execute when the command addresses a register that is less susceptible to errors. The address of the result register may be used for selecting the functional unit for example.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A processing circuit comprising:
  a plurality of functional units, including a first functional unit and a second functional unit, each configured to perform the same operation in response to a command, wherein the first functional unit has a lower susceptibility to soft errors than the second functional unit; and
  wherein:
    the processing circuit includes a configuration to execute the command using the first functional unit if a specified reliability level of the command is high; and
    the processing circuit includes a configuration to execute the command using the second functional unit if a specified reliability level of the command is low.

2. A processing circuit according to claim 1, wherein the first and second functional units have mutually different circuit structures for performing the same operation.

3. A processing circuit according to claim 2, wherein at least one of a circuit area, an operational power consumption, and a time needed to perform the operation of the second functional unit is lower than that of the first functional unit.

4. A processing circuit according to claim 2, further comprising a register file coupled to the first and second functional units, wherein:
  the first and second functional units comprise identical core circuits for executing the same operation,
  the first functional unit comprises an error correction support circuit configured to support error correction of at least one of an operand and a result of the core circuit, wherein the error correction support circuit is coupled between the core circuit of the first functional unit and the register file, and
  an input and an output of the core circuit of the second functional unit is coupled directly to the register file.

5. A processing circuit according to claim 2, further comprising an instruction issue circuit with a plurality of issue slots coupled to the functional units, the instruction issue circuit being configured to issue commands for the first and second functional units from different ones of the issue slots.

6. A processing circuit according to claim 1, further comprising a memory wherein program instructions for execution by the functional units define the specified reliability of a particular command based on a data dependency between the particular command and other commands of the program, wherein the particular command only uses operands from other commands for which at least one of a same or lower specified reliability to is associated with the particular command.

7. A method of generating a program having commands for a processor that includes a plurality of functional units that are each configured to execute a command of a same type of command for performing a same operation, the functional units having different levels of susceptibility to incurring a soft error during execution of said same type of command, comprising:
 receiving programmed commands;
 determining respective levels of reliability specified for execution of different ones of said same type of command at different portions of the program; and
 assigning the different ones of said same type of command to different respective functional units for execution by the assigned functional units, the different ones of said same type of command being assigned only to functional units that have at most a level of susceptibility to incurring the soft error that is compatible with the level of reliability that has been determined for respective different ones of said same type of command.

8. A method according to claim 7, wherein at least a portion of the method is executed using a computer compiler.

9. A method according to claim 7, wherein one of two levels of reliability are determined for each of said same type of command.

10. A method of generating a program having commands for a processing system that includes a plurality of functional units that are each configured to execute a command of a same type of command for performing a same operation, the functional units having different levels of susceptibility to incurring soft errors during execution of said same type of command, the method comprising:
 receiving programmed commands;
 receiving a specification of a level of reliability of results for execution of selected programmed commands of the received programmed commands;
 determining respective levels of reliability specified for execution of one or more of said selected programmed commands, including said same type of commands;
 assigning said same type of commands to respective functional units for execution by the assigned functional units, wherein said same type of commands are assigned only to functional units that have at most a level of susceptibility to incurring soft errors that is compatible with the level of reliability that has been determined for said same type of command from the specification;
 tracing back through the programmed commands to identify further ones of the programmed commands that are directly or indirectly dependent on said same type of command;
 assigning the further ones of the programmed commands to at least one of the functional units that have at most a level of susceptibility to incurring the soft errors that is compatible with the level of reliability as set forth in the received specification; and
 assigning remaining programmed commands of the programmed commands to at least one of the functional units having a lowest level of susceptibility to incurring the soft errors.

11. A method according to claim 10, further comprising issuing instructions from an instruction issue circuit having a plurality of issue slots, each coupled to a respective functional unit issue, wherein instructions are issued to the respective functional unit using the assignments.

12. A method according to claim 10, wherein said receiving a specification includes receiving a specification of a level of reliability of results for execution of selected programmed commands from one of two levels of reliability.

13. A method according to claim 10, wherein said tracing through the received programmed commands comprises tracing back through the received programmed commands to identify further ones of the programmed commands that produce results that directly or indirectly depend on results of said selected programmed commands.

14. A method according to claim 10, further comprising issuing instructions from an instruction issue circuit having a plurality of issue slots, each coupled to a respective functional unit, wherein instructions are issued to the respective functional unit using the assignments.

15. A method according to claim 10, further comprising executing the selected commands and the further ones of the programmed commands using the functional units to which the selected commands and further ones of the programmed commands are assigned.

16. A method according to claim 10, wherein said receiving a specification includes receiving a specification of two levels of reliability of results for execution of said selected programmed commands.

17. A method according to claim 10, further comprising executing the different ones of said same type of command using the functional units to which the respective commands are assigned.

18. A computer readable storage device storing first instructions for execution by a processor of a program compiler to generate second instructions for a processing system, wherein the processing system includes a plurality of functional units that are each configured to execute a command of a same type of command for performing a same operation, the functional units having different levels of susceptibility to incurring a soft error during execution of said same type of command, the first instructions comprising:
 instructions to receive commands that are to be included in the second instructions for execution by the processing system;
 instructions for using the received commands to determine respective levels of reliability specified for execution of different ones of said same type of command; and
 instructions for assigning different ones of said same type of command in the second instructions to different respective functional units for execution by the assigned functional units, the different ones of said same type of command being assigned only to functional units that have at most a level of susceptibility to incurring the soft error that is compatible with the level of reliability that has been determined for respective different ones of said same type of command.

19. A method of generating a program having commands for a processing system that includes a plurality of functional units that are each configured to execute selected program commands for performing a same operation, the functional units having different levels of susceptibility to incurring soft errors during execution of said selected commands, comprising:
 receiving programmed commands;
 determining respective levels of reliability specified for execution of one or more of said selected programmed commands;
 assigning the selected programmed commands to functional units based on whether a respective functional unit has a level of susceptibility to incurring the soft error that is compatible with the level of reliability needed for execution of given ones of the selected programmed commands; and assigning remaining commands of the received programmed commands to any of the functional units.

* * * * *

UNITED STATES PATENT AND TRADEMARK OFFICE
CERTIFICATE OF CORRECTION

| | | |
|---|---|---|
| PATENT NO. | : 8,176,361 B2 | Page 1 of 1 |
| APPLICATION NO. | : 12/673898 | |
| DATED | : May 8, 2012 | |
| INVENTOR(S) | : Hoogerbrugge | |

It is certified that error appears in the above-identified patent and that said Letters Patent is hereby corrected as shown below:

On Title Page 2, Item (56), under "OTHER PUBLICATIONS", Line 3, delete "p." and insert -- pp. --, therefor.

On Title Page 2, in Item (56), under "OTHER PUBLICATIONS", Line 3, delete "Inter-Ojbect" and insert -- Inter-Object --, therefor.

In Column 1, Line 10, delete "No" and insert -- No. --, therefor.

In Column 1, Line 22, delete "No" and insert -- No. --, therefor.

In Column 1, Line 30, delete "No" and insert -- No. --, therefor.

In Column 3, Line 17, delete "circuit" and insert -- circuit. --, therefor.

In Column 3, Line 18, delete "compilation" and insert -- compilation. --, therefor.

In Column 3, Line 19, delete "circuit" and insert -- circuit. --, therefor.

In Column 6, Line 5, delete "buffer 2," and insert -- buffer2, --, therefor.

In Column 9, Line 4, in Claim 6, delete "to is associated" and insert -- is associated --, therefor.

Signed and Sealed this
Thirty-first Day of July, 2012

David J. Kappos
*Director of the United States Patent and Trademark Office*